(12) United States Patent
Terakawa et al.

(10) Patent No.: US 8,568,270 B2
(45) Date of Patent: Oct. 29, 2013

(54) GEAR SHIFT CONTROL DEVICE FOR HYBRID VEHICLE DRIVE SYSTEM

(71) Applicant: Aisin Seiki Kabushiki Kaisha, Kariya (JP)

(72) Inventors: Tomomitsu Terakawa, Anjo (JP); Yasuhiro Hosoi, Chiryu (JP); Yuichiro Kitamura, Nagoya (JP); Yoshihide Suzuki, Toyoake (JP); Katsunori Ueda, Okazaki (JP); Shigeyuki Yoshida, Toyota (JP); Shunichi Hirao, Kyoto (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/628,520

(22) Filed: Sep. 27, 2012

(65) Prior Publication Data
US 2013/0079192 A1 Mar. 28, 2013

(30) Foreign Application Priority Data

Sep. 27, 2011 (JP) ................................. 2011-211007

(51) Int. Cl.
*B60W 10/02* (2006.01)
*B60W 10/06* (2006.01)
*B60W 10/08* (2006.01)

(52) U.S. Cl.
USPC .......................................................... 477/5

(58) Field of Classification Search
USPC ........................................................ 477/5, 174
See application file for complete search history.

(56) References Cited

U.S. PATENT DOCUMENTS

| 2009/0156355 A1* | 6/2009 | Oh et al. ........................... 477/5 |
| 2011/0230307 A1* | 9/2011 | Seel .................................. 477/5 |
| 2011/0294620 A1* | 12/2011 | Pruitt et al. ..................... 477/5 |
| 2012/0122630 A1* | 5/2012 | Huber et al. ..................... 477/5 |

FOREIGN PATENT DOCUMENTS

| JP | 2002-188716 A | 7/2002 |
| JP | 2004-282852 A | 10/2004 |

* cited by examiner

*Primary Examiner* — Edwin A Young
(74) *Attorney, Agent, or Firm* — Buchanan, Ingersoll & Rooney PC

(57) ABSTRACT

A gear shift control device for controlling a hybrid vehicle drive system including an engine, an automated transmission, a clutch, and a motor generator, includes a torque indication device for indicating a driver request torque determined in accordance with an operation amount of an accelerator operated by a driver, a power generation interruption device changing a vehicle state to an engine driven state using all of the engine torque when a preliminary gear shift condition is satisfied in a state where the engine drives a driving wheel and the motor generator is actuated to generate an electric power, and a gear shift control device reducing the engine torque and generating an assist torque by actuating the motor generator, disconnecting the clutch, and returning the clutch to a connected state after changing gear sets of the gear train when a gear shift condition of the automated transmission is satisfied.

7 Claims, 6 Drawing Sheets

GEAR SHIFT CONTROL DEVICE FOR HYBRID VEHICLE DRIVE SYSTEM

CROSS REFERENCE TO RELATED APPLICATIONS

This application is based on and claims priority under 35 U.S.C. §119 to Japanese Patent Application 2011-211007, filed on Sep. 27, 2011, the entire content of which is incorporated herein by reference.

TECHNICAL FIELD

This disclosure generally relates to a gear shift control device for a hybrid vehicle drive system.

BACKGROUND DISCUSSION

Various known drive systems for hybrid vehicles including an engine and a motor as a drive source are practically implemented in accordance with widespread use of hybrid vehicles. For example, according to a known structure, an input shaft of an automated transmission is connected to an output shaft of an engine via a clutch, and a motor is connected between an output shaft of the automated transmission and driving wheels. According to the foregoing construction, a motor generator, which is a motor having an electric generating function, is most likely adopted as a motor, which allows not to be provided with a separate generator. Further, for example, an automated manual transmission (AMT), which is a manual transmission selectively engaging a set of gears among plural sets of gears and automated by an actuator. The AMT provided with a clutch at an input side excels in giving a feeling that a torque increases in accordance with an operation of an accelerator when transmitting the torque compared to a planetary gear type automated transmission provided with a torque converter at an input side.

It is preferable that the feeling that a torque increases in accordance with an operation of an accelerator when transmitting the torque is ensured during a gear shifting operation and a feeling that the vehicle is not accelerated in response to an accelerator operation is not generated even at a disconnected state of the clutch. JP2002-188716A (i.e., hereinafter referred to as Patent reference 1) discloses a power transmission apparatus for hybrid vehicle which eliminates a feeling that the vehicle is not accelerated in response to an accelerator operation during a gear shift operation. The power transmission apparatus disclosed in Patent reference 1 includes an internal combustion engine, a transmission, a clutch arranged between the internal combustion engine and the transmission, an electric motor arranged between the clutch and driving wheels, and a control portion. The control portion is configured to actuate the electric motor before disconnecting the clutch upon detecting a shift point. Thus, according to Patent reference 1, because the drive torque from the electric motor is transmitted even if the drive torque from the internal combustion engine is not transmitted due to the disconnection of the clutch, the driving wheels are not assumed to be in a completely driven state. Further, noises and vibrations because of mechanical shakiness are not generated when shifting gears, and a shift feel is enhanced because a feeling that the vehicle is not accelerated in response to an accelerator operation is eliminated during the gear shift operation.

According to the power transmission apparatus disclosed in Patent reference 1, a gear shift operation is relatively easy and effects can be readily attained in a case where the electric motor is not in operation immediately before shifting gears, however, is not completely flawless. For example, according to a hybrid vehicle to which a motor generator is mounted in place of the electric motor, in a case where a state of charge of a battery declines, the vehicle travels while generating electric power. In those circumstances, modes of the motor generator is switched from a power generation mode to an assist mode during the gear shift operation, a drive torque transmitted to the driving wheels is assumed to be discontinuous, which may generate shift shock. Further, when performing a gear shift operation in a case where the motor generator performs a drive assist by adding an assist torque of the motor generator to an engine torque for the purpose of enhancing fuel economy under a state where state of charge of the battery is favorable, the drive torque is assumed to be discontinuous so that the shift shock may be generated.

A need thus exists for a gear shift control device for a hybrid vehicle drive system which is not susceptible to the drawback mentioned above.

SUMMARY

In light of the foregoing, the disclosure provides a gear shift control device for a hybrid vehicle drive system for controlling the hybrid vehicle drive system which includes an automated transmission including an input shaft configured to be rotated by an engine torque which is outputted from an output shaft of an engine mounted to a vehicle and which is controlled by an output control mechanism, and an output shaft rotatably connected to a driving wheel, the automated transmission selectively meshing one of plural gear sets of a gear train allowing to rotatably connect the input shaft and the output shaft with different gear ratios each other by a gear switching mechanism, a clutch configured to switch a connected state where the output shaft of an engine and the input shaft of the automated transmission are rotatably connected for adjusting a clutch torque and a disconnected state where the output shaft of an engine and the input shaft of the automated transmission are disconnected by a clutch actuation mechanism, and a motor generator rotatably connected to the output shaft of the automated transmission and the driving wheel, the motor generator selectively generating an assist torque which is addable to the engine torque for performing a drive assist of the driving wheel and generating an electric power by being actuated by a torque for electric power generation among the engine torque, the gear shift control device controlling the hybrid vehicle drive system to change a selection of the gear sets of the gear train for the automated transmission, includes a torque indication portion for indicating a drive torque which is determined in accordance with an operation amount of en accelerator operated by a driver and is requested to be outputted to the driving wheel as a driver request torque converted into the engine torque, a power generation interruption portion for gradually reducing the torque for electric power generation to be zero by portion of the output control mechanism and changing a vehicle state to an engine driven state using all of the engine torque when a preliminary gear shift condition of the automated transmission is satisfied in a state where the engine drives the driving wheel via the clutch, which is in the connected state, by the driver request torque among the engine torque and in a state where the motor generator is actuated to generate an electric power by the torque for electric power generation, a gear shift control portion reducing the engine torque by the output control mechanism and generating an assist torque corresponding to a decrement of the engine torque by actuating the motor generator, disconnecting the clutch by the clutch actuation mechanism, and returning the clutch to the connected state by the clutch actuation mechanism after changing the selection of the gear sets of the gear train by the gear switching mechanism when a gear shift condition of the automated transmission is satisfied during the engine driven state of the vehicle after an interruption of power generation by the power generation portion where the torque for electric power generation is zero.

According to another aspect of the disclosure, a gear shift control device for a hybrid vehicle drive system for controlling the hybrid vehicle drive system which includes an automated transmission including an input shaft configured to be rotated by an engine torque which is outputted from an output shaft of an engine mounted to a vehicle and which is controlled by an output control mechanism, and an output shaft rotatably connected to a driving wheel, the automated transmission selectively meshing one of plural gear sets of a gear train allowing to rotatably connect the input shaft and the output shaft with different gear ratios each other by a gear switching mechanism, a clutch including a clutch actuation mechanism switching a connected state where the output shaft of an engine and the input shaft of the automated transmission are rotatably connected for adjusting a clutch torque and a disconnected state where the output shaft of an engine and the input shaft of the automated transmission are disconnected, and a motor generator rotatably connected to the output shaft of the automated transmission and the driving wheel, the motor generator selectively generating an assist torque which is addable to the engine torque for performing a drive assist of the driving wheel and generating an electric power by being actuated by a torque for electric power generation among the engine torque, the gear shift control device controlling the hybrid vehicle drive system to change the gear sets of the gear train for the automated transmission, includes a torque indication portion for indicating a drive torque which is determined in accordance with an operation amount of an accelerator operated by a driver and is requested to be outputted to the driving wheel as a driver request torque converted into the engine torque, an assist interruption portion gradually reducing an assist torque to be zero by the output control mechanism for changing a vehicle state to an engine driven state only by the engine torque when a preliminary gear shift condition of the automated transmission is satisfied in a state where the engine drives the drive wheel via the clutch, which is in the connected state, by the engine torque and in a state where the motor generator generates the assist toque corresponding to a torque subtracting the engine torque from the driver request torque, a gear shift control portion reducing the engine torque by the output control mechanism and generating an assist torque corresponding to a decrement of the engine torque by actuating the motor generator, disconnecting the clutch by the clutch actuation mechanism, and returning the clutch to the connected state by the clutch actuation mechanism after changing the selection of the gear sets of the gear train by the gear switching mechanism when a gear shift condition of the automated transmission is satisfied during the engine driven state of the vehicle after an interruption of an assist by the assist torque where the assist torque is zero.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

One embodiment of a gear shift control device for a hybrid vehicle drive system will be explained with reference to FIGS. 1 to 8 as follows.

Figure 1:
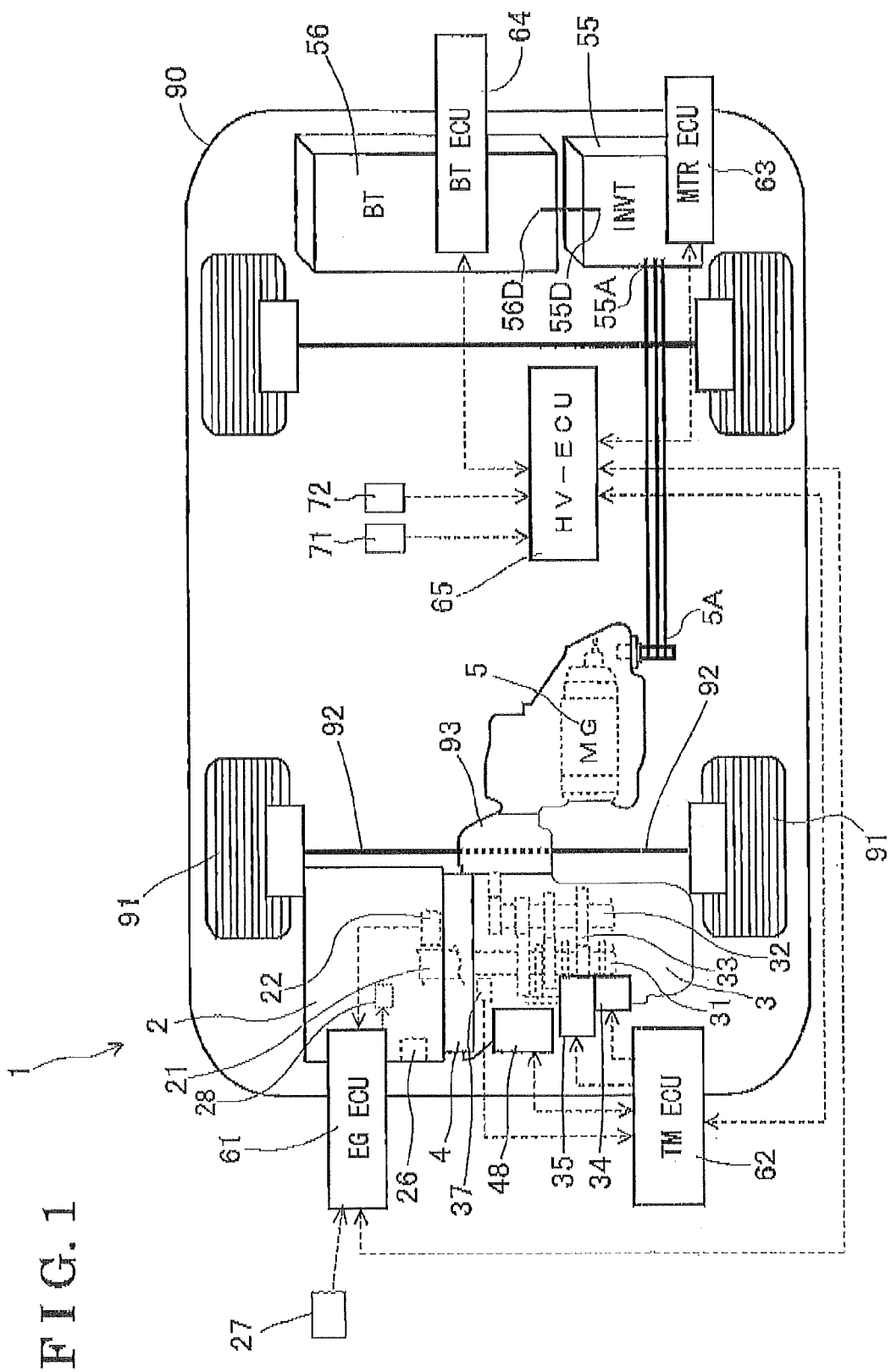
FIG. 1 is a schematic view of a drive system for a hybrid vehicle which is an object of a control by a gear shift control device according to an embodiment disclosed here.
Figure 2:
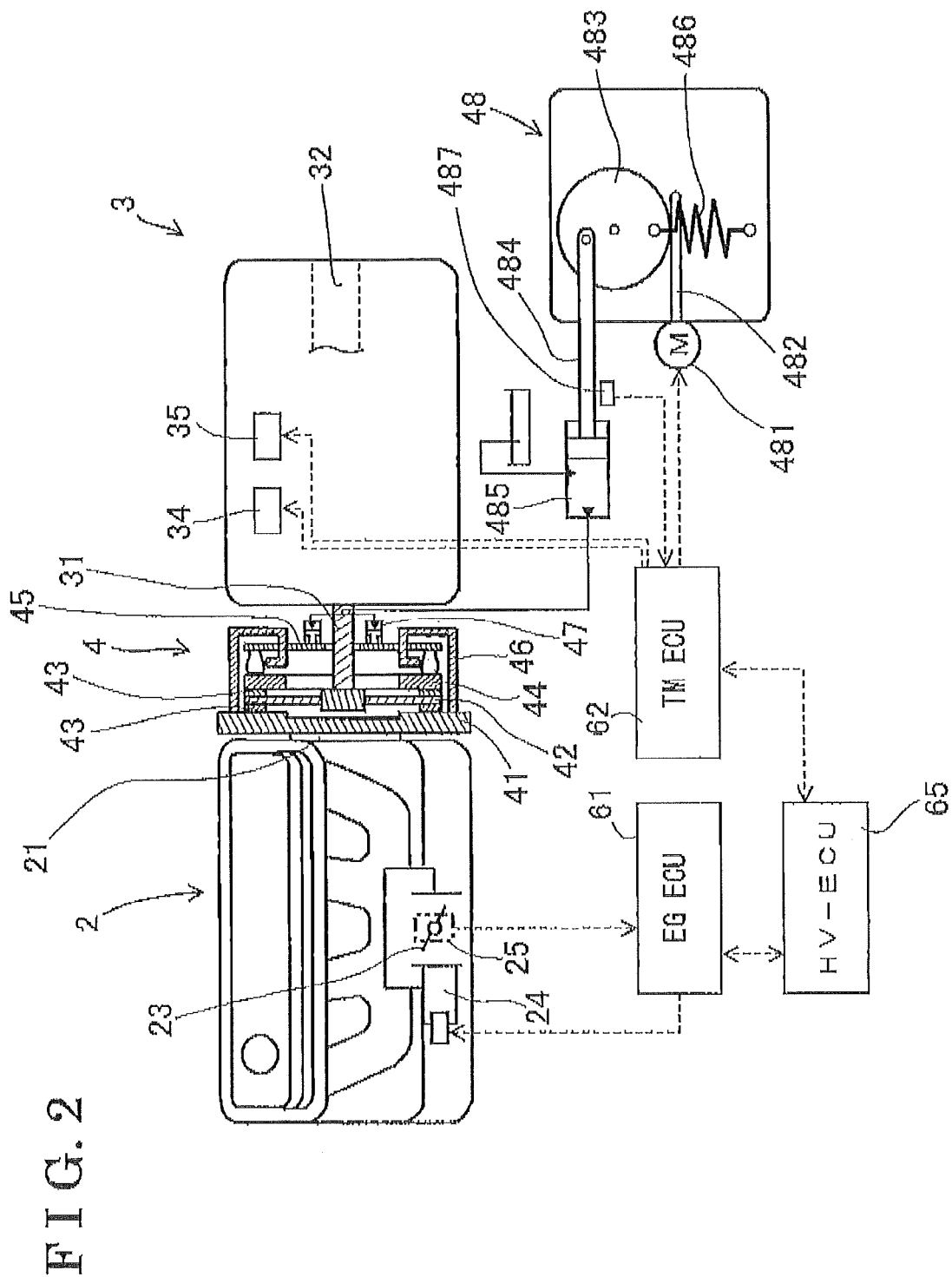
FIG. 2 is a schematic view of an engine, an automated transmission, and a clutch shown in FIG. 1.

As shown in FIG. 1, a hybrid vehicle drive system 1 is a drive system for a front-engine, front-wheel-drive type (FF type), and an engine 2 and a motor generator 5 serving as drive sources are mounted to a front portion of a chassis 90 to be in a parallel arrangement so that driving front wheels 91 are driven by one of the engine 2 and the motor generator 5 or both of the engine 2 and the motor generator 5. The hybrid vehicle drive system 1 includes an automated transmission 3 and a clutch 4. In FIGS. 1 and 2, arrows with dotted lines connecting elements show flows for controls.

As illustrated in FIG. 1, the engine 2 is transversely arranged at a forward side relative to an axle 92 of the driving front wheels 91 on the chassis 90. The engine 2, the clutch 4, and the automated transmission 3 are arranged in the mentioned order in a vehicle width direction, and the engine 2, the clutch 4, and the automated transmission 3 share a common rotational axis within a range from an output shaft 21 of the engine 2 to an input shaft 31 of the automated transmission 3. An engine rotation speed sensor 22, which is a non-contact sensor, for detecting a rotation speed of the output shaft 21 is provided in the vicinity of the output shaft 21 of the engine 2. Further, as shown in FIG. 2, the engine 2 is provided with a throttle valve (i.e., serving as an output control mechanism) 23 for regulating, or adjusting an air intake amount, and an Injector 28 for regulating, or adjusting a fuel supply amount in association with the air intake amount. Further, an actuator 24 for throttle for regulating, or adjusting a throttle opening degree Slt of the throttle valve 23 and a throttle position sensor 25 for detecting the throttle opening degree Slt are provided at the engine 2. The throttle valve 23 and the injector 28 serve as an output control mechanism for controlling an engine torque Te outputted from the output shaft 21 of the engine 2.

The clutch 4 corresponds to a dry-type single plate friction clutch which is hydraulically operated. The clutch 4 includes a flywheel 41, a clutch disc 42, a pressure plate 44, a diaphragm spring 45, a clutch cover 46, a concentric slave cylinder 47, and a clutch actuator (i.e., serving as a clutch actuation mechanism) 48. As illustrated in FIG. 2, the flywheel 41 is formed in a thick disc shape having a mass for maintaining inertia and is coaxially fixed to the output shaft 21 of the engine 2. A substantially cylindrical shape clutch cover 46 is provided to extend in an axial direction from an outer periphery portion of the flywheel 41 at a side opposite to a side which faces the engine 2. A substantially disc shape clutch disc 42 is positioned adjoining the flywheel 41 inside the clutch cover 46. The clutch disc 42 is connected to the input shaft 31 of the automated transmission 3 by means of a spline at a center portion thereof so as to integrally rotate, and a clutch facing 43 is secured to opposing ends of the clutch disc 42 at a portion closer to an outer periphery of the clutch disc 42.

The substantially annular shaped pressure plate 44 is provided adjoining the clutch disc 42 to be movable in an axial direction. The diaphragm spring 45 and the concentric slave cylinder 47 are configured to drive the pressure plate 44 (i.e., the diaphragm spring 45 and the concentric slave cylinder 47 are provided as a member for driving the pressure plate 44). Further, the clutch actuator 48 for operating the concentric slave cylinder 47 serves as a clutch drive mechanism. The clutch actuator 48 includes a direct current motor 481, a speed reduction mechanism 482 including a worm gear, an output wheel 483, an output rod 484, a master cylinder 465, an assist spring 486, and a stroke sensor 487.

Upon a rotational actuation of the direct current motor 481 of the clutch actuator 48, the output wheel 483 is rotated via the speed reduction mechanism 482, and the output rod 484 moves forward (leftwards in FIG. 2) or rearward (rightwards in FIG. 2). Then, a hydraulic pressure is generated at the master cylinder 485, the generated hydraulic pressure is transmitted to actuate the concentric slave cylinder 47 thus to actuate the pressure plate 44 in the axial direction via the diaphragm spring 45. The pressure plate 44 end the flywheel 41 sandwich the clutch disc 42 so that the pressure plate 44 presses the clutch disc 42. The pressure plate 44 is configured to change a pressure load of the clutch facing 43 of the clutch disc 42 slidably rotating relative to the flywheel 41. The assist spring 486 assists the output rod 484 to move in a forward direction. The stroke sensor 487 detects an operation amount Ma of the output rod 484.

Figure 3:
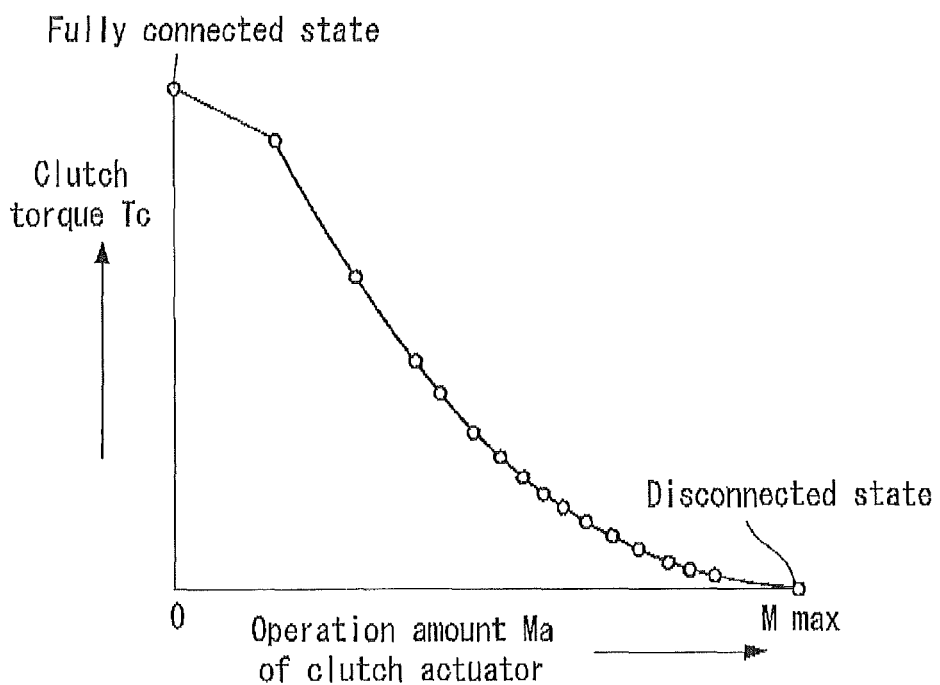
FIG. 3 is a graph showing torque transmission characteristics of the clutch according to the embodiment disclosed here.

Accordingly, the clutch 4 is configured to switch a connected state where the output shaft 21 of the engine 2 and the input shaft 31 of the automated transmission 3 are rotatably connected so that a clutch torque Tc is adjustable, and a disconnected state where the output shaft 21 of the engine 2 and the input shaft 31 of the automated transmission 3 are disconnected. FIG. 3 shows torque transmission characteristics of the clutch 4. A horizontal axis in FIG. 3 shows the operation amount Ma of the output rod 484 of the clutch actuator 48, and a vertical axis in FIG. 3 shows the transmissible clutch torque Tc. A normally connected type clutch, which is assumed to be a fully connected state where the clutch torque Tc is maximized when the operation amount Ma is zero (i.e., operation amount Ma=0), is applied as the clutch 4. With the clutch 4, in accordance with an increase in the operation amount Ma, the transmissible clutch torque Tc at a half connected state is reduced, and the clutch 4 is configured to be disconnected when the operation amount Ma is assumed to be the maximum (i.e., operation amount Ma=Mmax).

An automated manual transmission (AMT), which is structured to be automated by providing actuators 34, 35 to a manual transmission for selectively engaging one of plural gear sets of a gear train 33 by a manual operation of a shift lever by a driver, is applied as the automated transmission 3. As shown with dotted lines in FIG. 1, the automated transmission 3 includes a parallel axes gear meshing type structure which includes the gear train 33 with five forward speed ratios and one reverse speed ratio provided between the input shaft 31 and the output shaft 32 which are arranged in parallel to one another. The input shaft 31 is actuated to rotate by an engine torque outputted from the engine 2 via the clutch 4. A rotation speed sensor 37 for detecting an input rotation speed of the input shaft 31 is provided in the vicinity of the input shaft 31. The output shaft 32 is meshed with an input side of a differential mechanism 93 positioned in a center in the vehicle width direction, and is rotatably connected to the driving front wheels 91 via the differential mechanism 93.

As shown in FIG. 2, the automated transmission 3 includes a shift actuator 34 and a select actuator 35 which serve as a gear switching mechanism for selectively engaging one of the plural gears of the gear train 33. A known method is applied for the actuation of the shift actuator 34 and the select actuator 35.

As shown in FIG. 1, the motor generator 5 is positioned at a rearward relative to the axle 92 of the driving front wheels 91 on the chassis 90. A three-phase alternating current electrical rotating machine which is generally applied for the hybrid vehicle is applied as the motor generator 5. An output shaft of the motor generator 5 is rotatably connected to the input side of the differential mechanism 93 via a reduction speed mechanism. Accordingly, the output shaft of the motor generator 5 is rotatably connected to the output shaft 32 of the automated transmission 3 and the driving front wheels 91.

An inverter (i.e., also referred to as INVT) 55 and a battery (i.e., also referred to as BT) 56 are mounted to a rear portion of the chassis 90 for actuating the motor generator 5. Application of the weights is balanced at front and rear of the chassis 90 by mounting the engine 2 and the automated transmission 3 to the front portion of the chassis 90 and by mounting the battery 56 and the inverter 55 to the rear portion of the chassis 90. The inverter 55 includes an alternating current terminal 55A and a direct current terminal 55D which serve as input and output terminals. The alternating current terminal 55A is connected to an electric power source terminal 5A of the motor generator 5 and the direct current terminal 55D is connected to a terminal 56D of the battery 56. The inverter 55 includes a direct current-alternating current converting function for converting a direct current electric power, which is outputted from the battery 56, into an alternating current electric power having variable frequency, and an alternating current-direct current converting function for converting the alternating current electric power generated at the motor generator 5 to the direct current electric power to charge the battery 56. The battery 56 may be provided exclusive for driving the vehicle, or may be shared with other use.

When the alternating current electric power is supplied, the motor generator 5 serves as an electric motor to generate an assist torque Tast which can be added to the engine torque Te thus to assist the driving of the driving front wheels 91. The motor generator 5 serves as a power generator, or electric generator when the motor generator 5 is actuated by a power generation toque Tgen which corresponds to a part of the engine torque Te to charge the battery 56.

In order to control portions of the drive system 1, electronic control units (ECUs) are provided, respectively. As shown in FIG. 1, the drive system 1 includes an engine electronic control unit (engine ECU, also referred to as EG ECU) 61, a transmission electronic control unit (transmission ECU, also referred to as TM ECU) 62, a motor electronic control unit (motor ECU, referred to as MTR ECU) 63, and a battery electronic control unit (battery ECU, also referred to as BT ECU) 64. The drive system 1 further includes a hybrid vehicle electronic control unit (HV-ECU) 65 for controlling the drive system 1 as a whole. Each of the engine ECU 61, the transmission ECU 62, the motor ECU 63, and the battery ECU 64 for controlling each of assigned portions is connected to the HV-ECU 05 to exchange the bilaterally necessary information, and is managed and controlled by the HV-ECU 65. Each of the engine ECU 61, the transmission ECU 62, the motor ECU 63, the battery ECU 64, and the HV-ECU 65 includes a CPU portion for executing an arithmetic processing, a memory portion, for example, a ROM and a RAM for storing a program and various maps, and an input-output portion for exchanging the information.

The engine ECU 61 actuates a starter 26 (see FIG. 1) in response to an operation of an ignition switch 27 (see FIG. 1) to start the engine 2. Further, the engine ECU 61 obtains a signal of an engine rotation speed Ne of the output shaft 21 from the engine rotation speed sensor 22 and obtains a signal of a throttle opening degree Slt from the throttle position sensor 25. Then, the engine ECU 61 commands the actuator 24 for throttle to open and close the throttle valve 23 while monitoring the engine rotation speed Ne of the output shaft 21, and the engine ECU 61 controls the injector 28 thus to control the engine torque Te and the engine rotation speed Ne. According to the embodiment, the engine rotation speed Ne is controlled not just by an operation amount of an accelerator pedal applied by a driver and the engine rotation speed Ne is controlled by a command from the HV-ECU 65 prior to the operation of the accelerator pedal by the driver.

The transmission ECU 62 executes a gear shift control by controlling the clutch 4 and the automated transmission 3 in association with each other. The transmission ECU 62 actuates the direct current motor 481 of the clutch actuator 48 to control a transmissible clutch torque Tc, and obtains a signal of the operation amount Ma of the output rod 484 from the stroke sensor 487 to recognize, or acquire the clutch torque Tc at the time. The transmission ECU 62 obtains an input rotation speed from the rotation speed sensor 37 of the automated transmission 3, and actuates the shift actuator 34 and the select actuator 35 to selectively engage one of the gear sets of the gear train 33 to control a change of gear stages.

Figure 4:
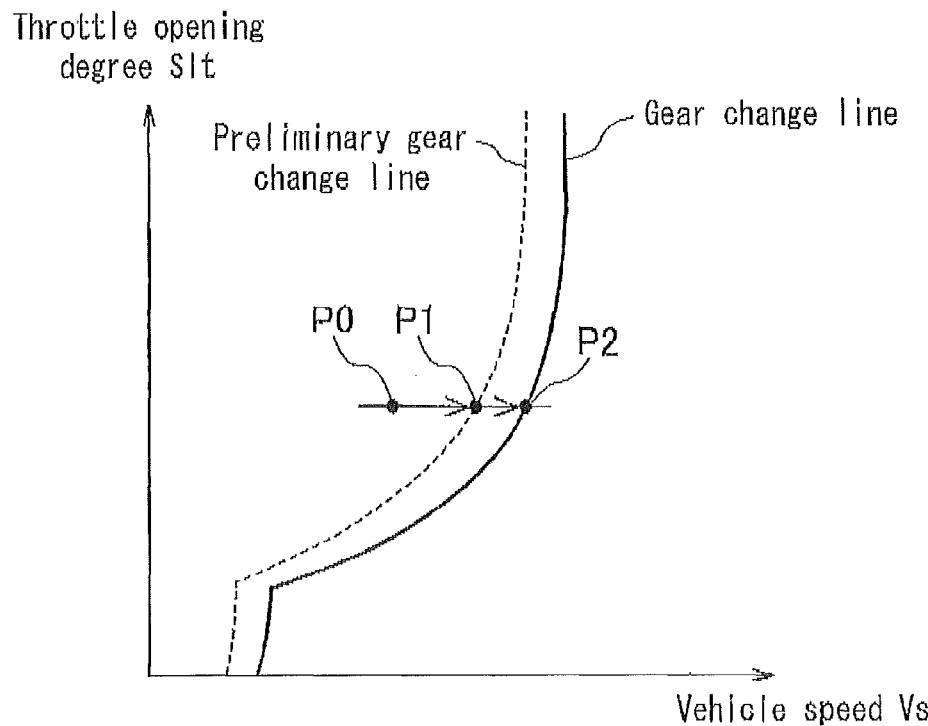
FIG. 4 is a graph showing a preliminary gear change line and a gear change line of an automated transmission according to the embodiment disclosed here.

The transmission ECU 62 stores, or retains map data of a preliminary gear change line and a gear change line determined for each of gear stages (gear sets) of gear trains 33. FIG. 4 shows the preliminary gear change line and the gear change line of the automated transmission 3. In FIG. 4, a horizontal axis shows vehicle speed Vspd, a vertical axis shows the throttle opening degree Slt of the throttle valve 23 of the engine 2, the preliminary gear change line during an upshift operation from a first speed to a second speed is indicated with a dotted line, and the gear change line is indicated with a solid line. As shown in FIG. 4, the preliminary gear change line and the gear change line have curve in similar configuration, and the gear change line is positioned having a higher vehicle Vspd compared to the preliminary gear change line.

As illustrated In FIG. 4, when a vehicle travels selecting first speed gear of the gear train 33 of the automated transmission 3 as indicted with point P0 and when the vehicle speed Vspd gradually increases to reach point P1 on the preliminary gear change line, the transmission ECU 62 determines that a preliminary gear shift condition is satisfied. When the vehicle speed Vspd further increases to reach point P2 on the gear change line, the transmission ECU 62 determines that a gear shift condition is satisfied. Namely, the fulfillment of the preliminary gear shift condition allows to presume that the gear shift condition is about to meet. In those circumstances, the fulfillment of the preliminary gear shift condition does not necessarily lead to satisfy the gear shift condition, and even if the preliminary gear shift condition is once satisfied, the preliminary gear shift condition may be dissolved, or canceled without the fulfillment of the gear shift condition. A gear shift control when the preliminary gear shift condition and the gear shift condition are satisfied will be explained in association with an operation of the gear shift control device hereinafter.

The motor ECU 63 controls the inverter 55 to control an operation of the motor generator 5. For example, by controlling the inverter 55 to supply the alternating current electric power from the inverter 55 to the motor generator 5, the motor generator 5 functions as the electric motor to generate the assist torque Tast. The frequency of the alternating current electric power needs to be controlled to be a value in accordance with the rotation speed of the output shaft 32 of the automated transmission 3. Further, for example, by variably controlling a virtual value, or effective value of the alternating current electric power by a pulse width modulation control (PWM control), the level of the assist torque Tast may be regulated, or adjusted. Further, the motor ECU 63 is configured to control the inverter 55 to receive the alternating current electric power generated at the motor generator 5 so that the motor generator 5 serves as the power generator, or electric generator.

The battery ECU 64 manages a state of charge SOC of the battery 56. The information of the state of charge SOC is sent to the HV-ECU 65 and is referred to at various controls. In a case where the state of charge SOC declines or excessively increases, a control for swiftly regaining a favorable state is performed.

The HV-ECU 65 shares the information necessary among the engine ECU 61, the transmission ECU 62, the motor ECU 63, and the battery ECU 64 for controlling each of assigned portions to control the drive system 1 as a whole. The HV-ECU 65 obtains the information of an accelerator pedal position from an accelerator pedal position sensor 71, and obtains the information of the vehicle speed Vspd from a vehicle speed sensor 72. The accelerator pedal position sensor 71 is a sensor for detecting an operation amount of the accelerator pedal (acceleration means) operated by a driver, that is, the accelerator pedal position. A level of a drive torque required for the driving front wheels 91 for propelling, or traveling the vehicle is determined on the basis of the accelerator pedal position. In a case where an actually generated torque is deficient relative to the required level of the drive torque, the driver who does not perform the gear shift operation by himself/herself has a feeling that the vehicle is not accelerated in response to an accelerator operation. The feeling that the vehicle is not accelerated in response to an accelerator operation is not raised as a problem with a drive system which includes a manually operated clutch and transmission because the driver performs a gear shift operation by himself/ herself.

The gear shift control device includes a torque indication means (torque indication portion), a power generation interruption means (power generation interruption portion), an assist interruption means (assist interruption portion), a gear shift control means (gear shift control portion), and an engine torque gradually reducing means (engine torque gradually reducing portion). The torque indication means, the power generation interruption means, the assist interruption means, the gear shift control means, and the engine torque gradually reducing means are realized by software of the engine ECU 61, the transmission ECU 62, the motor ECU 63, the battery ECU 64, and the HV-ECU 65, and are executed by cooperatively operating the engine ECU 61, the transmission ECU 62, the motor ECU 63, the battery ECU 64, and the HV-ECU 65.

The torque indication means is a means for indicating a drive torque required for the driving front wheels 91 as a driver request torque Tdrv which is converted into the engine torque Te. Because the level of the drive torque is changeable, for example, depending on a gear ratio between the input shaft 31 side and the output shaft 32 side of the automated transmission 3, the drive torque is converted into a torque at the position of the output shaft 21 of the engine 2. Hereinafter, an electric power generation torque (serving as a torque for electric power generation) Tgen for actuating the motor generator 5 and the assist torque Tast which the motor generator 5 generates will be explained with reference too value of a torque at the position of the output shaft 21 of the engine 2.

The power generation interruption means is a means which operates when the engine 2 drives the driving front wheels 91 via the clutch 4 in a connected state by means of the driver request torque Tdrv among the engine torque Te and when the motor generator 5 is actuated by the electric power generation torque Tgen to generate the electric power. The power generation interruption means is operated when the preliminary gear shift condition of the automated transmission 3 is satisfied. In those circumstances, the power generation interruption means interrupts the generation of the electric power by gradually reducing the electric power generation torque Tgen to zero by regulating the throttle valve 23, then the vehicle is assumed to be in an engine driven state where the vehicle is driven using all of the engine torque Te (i.e., an engine driven state of the vehicle where the vehicle is driven using all of the engine torque Te).

The assist interruption means is a means which is operated when the engine 2 drives the driving front wheels 91 via the clutch 4 which is in the connected state by means of the engine torque Te and when the motor generator 5 generates the assist torque Tast corresponding to a torque obtained by subtracting the engine torque Te from the driver request torque Tdrv to assist the driving of the driving front wheels 91. The assist interruption means is operated when the preliminary gear shift condition of the automated transmission 3 is satisfied. In those circumstances, the assist interruption means temporarily interrupts a drive assist by controlling the inverter 55 to gradually reduce the assist torque Tast of the motor generator 5 to be zero, then the vehicle is assumed to be in an engine driven state where the vehicle travels only by the engine torque Te (i.e., an engine driven state of the vehicle where the vehicle travels only by the engine torque Te).

The gear shift control means is a means which is operated consecutively after the operation of the power generation interruption means and the assist Interruption means. Upon the fulfillment of the gear shift condition of the automated transmission 3 in the engine driven state of the vehicle, first, the gear shift control moans regulates the throttle valve 23 to reduce the engine torque Te and actuates the motor generator 5 as the electric motor to generate the assist torque Tast corresponding to the reduced amount of the engine torque Te. Second, the gear shift control means operates the clutch actuator 48 to disconnect the clutch 4. Third, the gear shift control means switches, or changes the selections of the gear sets of the gear train 33 (i.e., changing gears) by the shift actuator 34 and the select actuator 35. Thereafter, fourth, the gear shift control means operates the clutch actuator 48 to restore the clutch 4 to the connected state.

The engine torque gradually reducing means is a means which gradually reduces the engine torque Te to be equal to a maximum assist torque TaM when the engine torque Te exceeds the maximum assist torque TaM which the motor generator 5 is capable of generating, or allows to generate before staring the operation of the gear shift control means. According to the embodiment, the engine torque gradually reducing means operates consecutively after the operation of the power generation interruption means or the assist interruption means.

Figure 5:
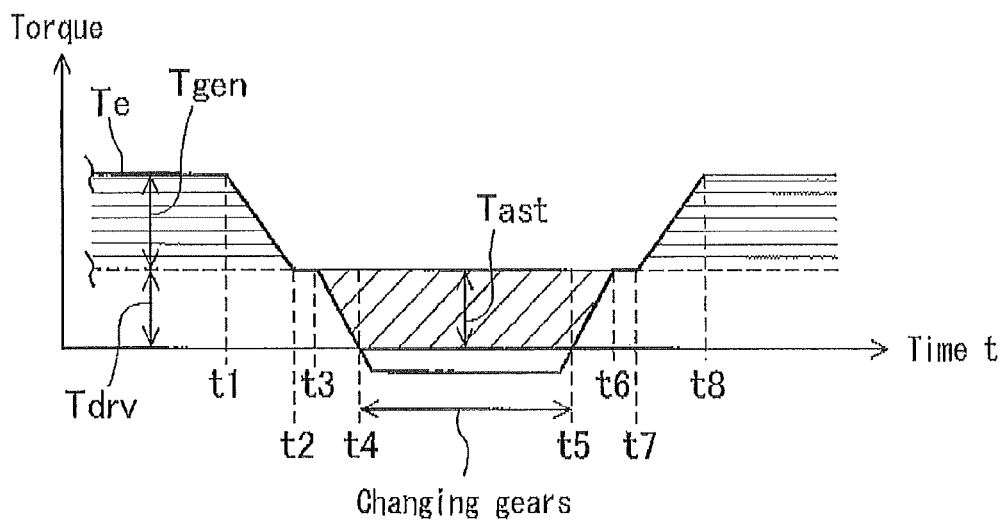
FIG. 5 is an explanatory view of a gear shift control operation when a vehicle travels while generating electric power with a motor generator according to the embodiment disclosed here.
Figure 6:
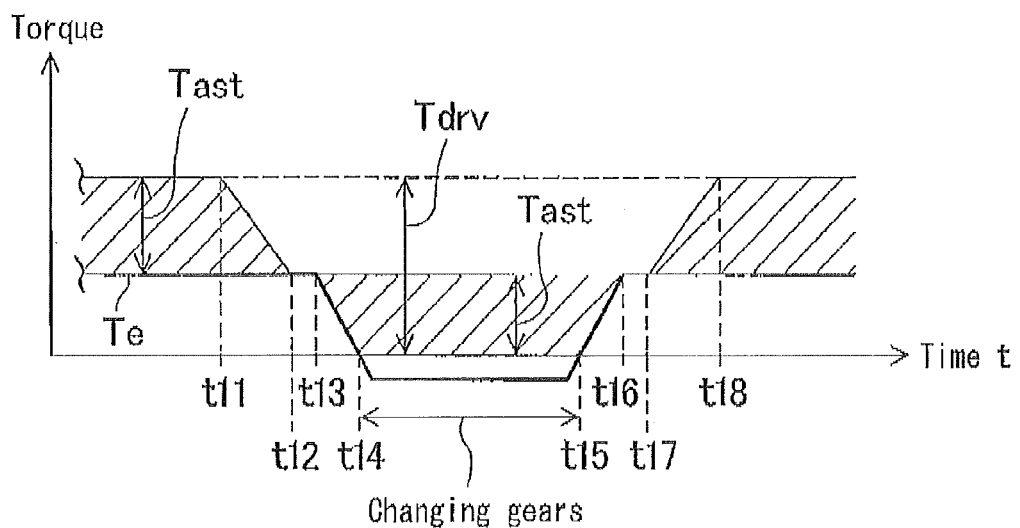
FIG. 6 is an explanatory view of the gear shift control operation when the vehicle travels while performing a drive assist with the motor generator according to the embodiment disclosed here.
Figure 7:
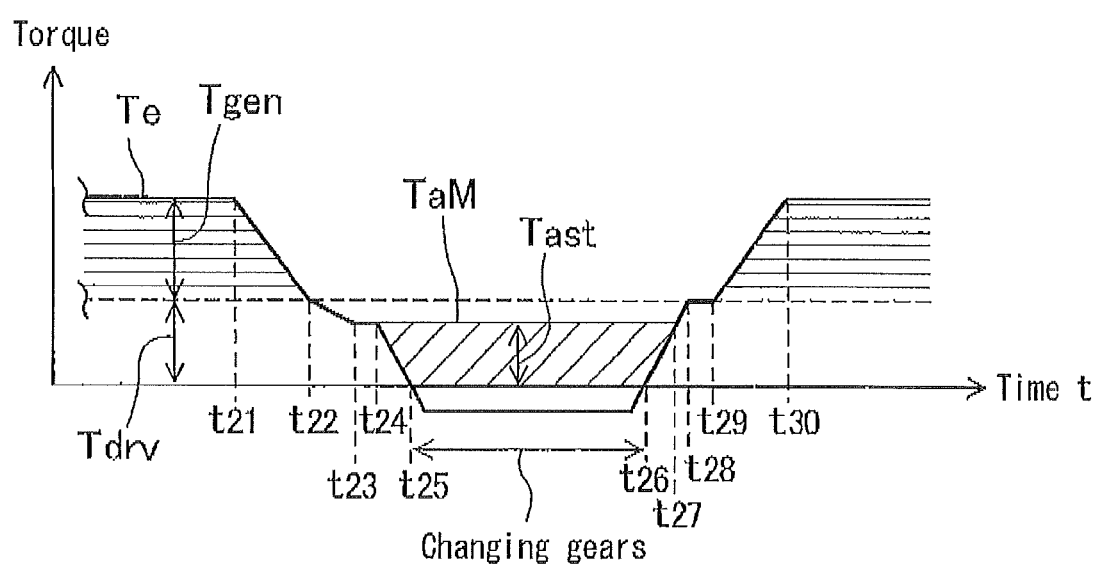
FIG. 7 is an explanatory view of the gear shift control operation when the vehicle travels while generating electric power with the motor generator and when an engine torque exceeds a maximum assist torque according to the embodiment disclosed here.

Next, the operation of the gear shift control device will be explained with reference to FIGS. 5 to 7. In FIGS. 5 to 7, a horizontal axis indicates time t, a vertical axis indicates a torque, and a bold solid line indicates a temporal change of the engine torque Te. Regions provided with cross hatching with horizontal lines indicates the electric power generation torque Tgen among the engine torque Te. Regions provided with cross hatching with oblique lines indicate the assist torque Tast of the motor generator 5.

Referring to FIG. 5, initially, the first speed is selected at the gear train 33 of the automated transmission 3, the driving front wheels 91 are driven by the driver request torque Tdrv among the engine torque Te and the motor generator 5 is actuated by the electric power generation torque Tgen to generate the electric power. In the foregoing state, a revel of the application of the accelerator pedal detected by the accelerator pedal position sensor 71 is relatively small, which is generated when the driver request torque Tdrv is small and there is a reserve of the engine torque Te, or when charging is requested in a state where the state of charge of the battery 56 is declined. In those circumstance, the driver request torque Tdrv is substantially constant during the gear shift control. When the vehicle speed Vspd gradually increases and the preliminary gear shift condition is satisfied at time t1, the power generation interruption means starts operating. The power generation interruption means controls the throttle valve 23 and the injector 28 to gradually reduce the electric power generation torque Tgen to be zero, and the vehicle travel state is changed to the engine driven state using all of the engine torque Te at time t2.

Thereafter, the vehicle speed Vspd further increases and when the gear shift condition is satisfied at time t3, the gear shift control means starts operating. The gear shift control means controls the throttle valve 23 and the injector 28 to reduce the engine torque Te, and actuates the motor generator 5 to generate the assist torque Tast corresponding to the reduced amount of the engine torque Te. That is, the assist torque last corresponding to the amount subtracting the engine torque Te from the driver request torque Tdrv is generated. Thus, the drive torque driving the driving front wheels 91 is gradually changed to the assist torque Tast, the engine torque Te is assumed to be zero at time t4, and the clutch 4 is disconnected by the clutch actuator 48. Thus, the driving front wheels 91 are driven only by the assist torque Tast which substantially agrees with, or corresponds to the driver request torque Tdrv. Further, at time t4, the switching, or changing operations of the selections of the gear set of the gear train 33 (i.e., changing gears) by the actuators 34, 35 of the automated transmission 3 starts, and a gear engagement for the second speed stage is completed at time t5. From time t4 to time t5, the engine torque Te is assumed to have a negative value which serves as a braking force to reduce the engine rotation speed Ne.

At time t5, the clutch actuator 48 starts actuating the clutch 4 to be the connected state, the engine torque Te increases due to the control of the throttle valve 23 and the Injector 28 thereafter, and simultaneously, the assist torque Tast reduces to offset the increments of the engine torque Te. Accordingly, at time t6, the clutch 4 is fully connected (i.e., fully connected state), the engine toque Te agrees with, or corresponds to the driver request torque Tdrv, end the assist torque Tast is assumed to be zero to end the gear shift control operation. Thereafter, at time t7, the addition of the electric power generation torque Tgen to the engine torque Te starts to restart the electric power generation by the motor generator 5, then the electric power generation torque Tgen gradually increases to return to the original level at time t8.

Referring to FIG. 6, initially, the first speed is selected at the gear train 33 of the automated transmission 3, the driving front wheels 91 are driven by the engine torque Te and the motor generator 5 generates the assist torque That corresponding to the amount subtracting the engine torque Te from the driver request torque Tdrv to perform the drive assist of the driving front wheels 91. In the foregoing state, a level of the application of the accelerator pedal detected by the accelerator pedal position sensor 71 is relatively large, which is generated when the driver request torque Tdrv is large and there is a shortage of the engine torque Te, or when the state of charge of the battery 56 is favorable and the improvement of fuel efficiency is expected by the drive assist (i.e., by performing the drive assist) by discharging the electricity. In those circumstances, the driver request torque Tdrv is substantially constant during the gear shift control operation. The vehicle speed Vspd gradually increases and when the preliminary gear shift condition is satisfied at time t11, the assist interruption means starts operating. The assist interruption means stops the motor generator 5 to gradually reduce the assist torque Tast to be zero. In those circumstances, even if the position of the accelerator pedal detected by the accelerator pedal position sensor 71 (i.e., the level of the application of the accelerator pedal) is constant, because a command from the assist interruption means is prioritized, the drive torque transmitted to the driving front wheels 91 is assumed to be smaller than the driver request torque Tdrv, and the state of the vehicle is changed to the engine driven state only by the engine torque Te at time t12.

Thereafter, the vehicle speed Vspd further increases and when the gear shift condition is satisfied at time t13, the gear shift control means starts operating. The gear shift control means reduces the engine torque Te, and generates the assist torque Tast corresponding to the reduced amount of the engine torque Te by the actuation of the motor generator 5. Accordingly, the engine torque Te is assumed to be zero at time t14, the clutch 4 is disconnected by the clutch actuator 48 (i.e., disconnected state), and a part of the driver request torque Tdrv is supplied by the assist torque Tast. Further, at time t14, the switching, or changing operations of the selections of the gear set of the gear train 33 (i.e., changing gears) by the actuators 34, 35 of the automated transmission 3 starts, and the gear engagement for the second speed stage is completed at time t15. From time t14 to time t15, the engine torque Te is assumed to have a negative value which serves as a braking force to reduce the engine rotation speed Ne.

At time t15, the clutch actuator 48 starts actuating the clutch 4 to be in the connected state, the engine torque Te increases due to the control of the throttle valve 23 and the injector 28 thereafter, and simultaneously, the assist torque Tast reduces to offset the increments of the engine torque Te. Accordingly, at time t16, the clutch 4 is fully connected (i.e., fully connected state), the engine toque Te returns to be the original level, and the assist torque Tast is assumed to be zero to end the gear shift control operation. Thereafter, at time t17, the drive assist by the motor generator 5 is restarted to generate the assist torque Tast, and the assist torque Tast gradually increases to return to (to be) the level of the initial driver request torque Tdrv at time t18.

Referring to FIG. 7, initially, the first speed is selected at the gear train 33 of the automated transmission 3, the driving front wheels 91 are driven by the driver request torque Tdrv among the engine torque Te and the motor generator 5 is actuated by the electric power generation torque Tgen to generate the electric power. In the foregoing state, the vehicle speed Vspd gradually increases and when the preliminary gear shift condition is satisfied at time t21, the power generation interruption means starts operating. The power generation interruption means controls the throttle valve 23 and the injector 28 to gradually reduce the electric power generation torque Tgen to be zero, and the travel state of the vehicle is changed to the engine driven state using all of the engine torque Te at time t22. In this case, the engine torque Te exceeds the maximum assist torque TaM which the motor generator 5 is capable of generating, and the engine torque gradually reducing means starts operating. The engine torque gradually reducing means gradually reduces the engine torque Te from time t22, and stops the gradual reduction of the engine torque Te when the engine torque Te is assumed to be equal to the maximum assist torque TaM at time t23.

Thereafter, the vehicle Vspd further increases and when the gear shift condition is satisfied at time t24, the gear shift control means starts operating. The gear shift control means reduces the engine torque Te and actuates the motor generator 5 to generate the assist torque Tast corresponding to the reduced amount of the engine torque Te so as not to exceed the maximum assist torque TaM. Accordingly, the drive torque for driving the driving front wheels 91 is gradually changed to the assist torque Tast, the engine torque Te is assumed to be zero at time t25, and the clutch 4 is disconnected by the clutch actuator 48. The driving front wheels 91 are driven by the maximum assist torque TaM which corresponds to a part of the driver request torque Tdrv. Further, at time t25, the switching, or changing operations of the selections of the gear sets of the gear train 33 (i.e., changing gears) by the actuators 34, 35 of the automated transmission 3 starts, and the gear engagement for the second speed stage is completed at time t26. From time t25 to time t26, the engine torque Te is assumed to have a negative value which serves as a braking force to reduce the engine rotation speed Ne.

At time t26, the clutch actuator 48 starts actuating the clutch 4 to be the connected state, the engine torque Te increases due to the control of the throttle valve 23 and the injector 28 thereafter, and simultaneously, the assist torque Tast reduces to offset the increments of the engine torque Te. Accordingly, at time t27, the clutch 4 is fully connected (i.e., fully connected state), the engine toque Te is assumed to agree with, or correspond to the level of the maximum assist torque TaM, and the assist torque Tast is assumed to be zero. Thereafter, the engine torque Te further increases to substantially agree with, or correspond to the driver request torque Tdrv at time t28, and the gear shift control operation is completed. Thereafter, at time t29, the addition of the electric power generation torque Tgen to the engine torque Te starts to restart the electric power generation by the motor generator 5, and the electric power generation torque Tgen gradually increases to return to the original level at time t30.

Figure 8:
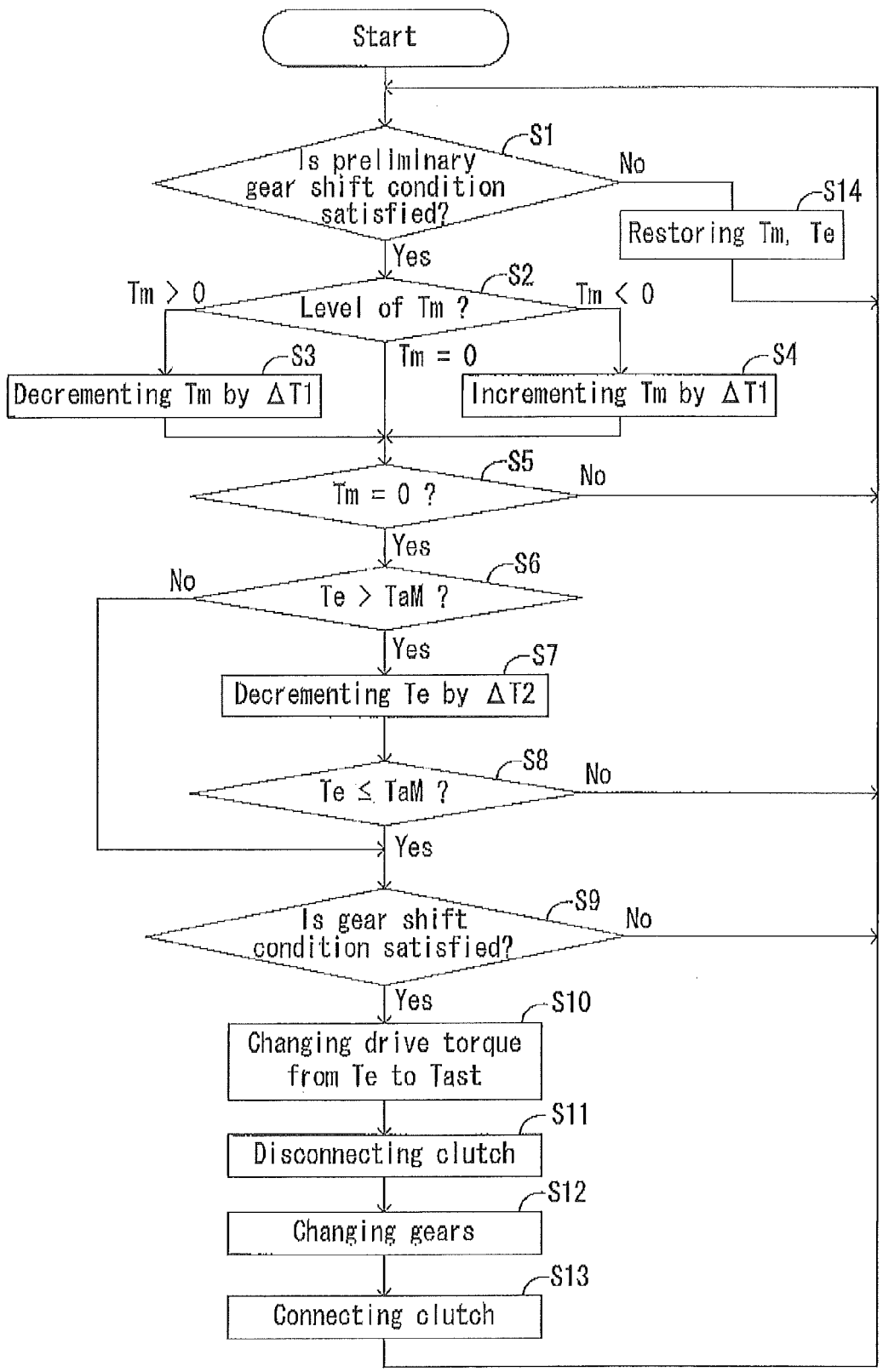
FIG. 8 is a flowchart for a gear shift control for the gear shift control device according to the embodiment disclosed here.

A flow for executing the gear shift control explained with reference to FIGS. 5 to 7 will be explained as follows. FIG. 8 shows a gear shift control flow for the gear shift control device according to the embodiment. In those circumstances, a motor torque Tm in FIG. 8 shows a torque outputted from the motor generator 5, a positive value indicates the assist torque Tast for driving the driving front wheels 91, and a negative value indicates the electric power generation torque Tgen among the engine torque Te.

As illustrated in FIG. 8, at Step S1 of the gear shift control flow, whether the preliminary gear shift condition is satisfied is determined, and the transaction advances to Step S2 when the preliminary gear shift condition is satisfied. In Step S2, whether the motor toque Tm has the positive value, whether the motor torque Tm is equal to zero, or whether the motor torque Tm has the negative value is determined, and the transaction advances to either one of Steps S3, S5, S4 depending on the determination results. When the motor torque Tm has the positive value, at Step S3, the Motor torque Tm is reduced by a control amount ΔT1 (i.e., so that the assist torque Tast is reduced towards zero, or approaches to zero), then the transaction advances to Step S5. When the motor torque Tm is the negative value, at Step S4, the motor torque Tm is incremented by the control amount ΔT1 (i.e., so that the electric power generation torque Tgen is reduced towards zero, or approaches to zero), then the transaction advances to Step S5. Whether the motor torque Tm is or comes to be zero is determined at Step S5. In a case where the motor torque Tm is not zero at Step S6, the transaction returns to the Step S1.

Thus, in a state where the preliminary gear shift condition is satisfied, the transaction in Step S1 to S5 is repeated so that the motor torque Tm is gradually reduced until being zero. The transaction for repeating the Steps S1, S2, S3, and S5 so that the motor toque Tm is assumed to be zero when the motor torque Tm is the positive value corresponds to the assist interruption means. The transaction for repeating the Steps S1, S2, S4, and S5 so that the motor torque Tm is assumed to be zero when the motor torque Tm is the negative value corresponds to the power generation interruption means. A case where the motor torque Tm is zero at the first transaction of Step S2 corresponds to a case where the motor generator 5 performs none of the drive assist and the electric power generation.

When the motor torque Tm is zero at Step S5, the transaction advances to Step S6. At Step S6, whether the engine torque Te exceeds the maximum assist torque TaM is determined, and the transaction advances to Step S7, in a case where the engine torque Te exceeds the maximum assist torque TaM. At Step S7, the engine torque Te is reduced by a control amount ΔT2, then transaction advances to Step S8. At Step S8, whether the engine torque Te is assumed to be equal to or less than the maximum assist torque TaM is determined, and the transaction returns to Step S1 in a case where the engine torque Te is not equal to or less than the maximum assist torque TaM (that is, in a case where the condition is not satisfied). Thus, in a state where the preliminary gear shift condition is satisfied and the motor torque Tm is zero, the transaction in Steps S1, S2, and S5 to S8 is repeated so that the engine torque Te is gradually reduced until being equal to or less than the maximum assist torque TaM. The transaction for repeating the Steps S6 to S8 corresponds to the engine torque gradually reducing means.

In a case where the engine torque Te is initially equal to or less than the maximum assist torque TaM at Step S6, and in a case where the engine torque Te is assumed to be equal to or less than the maximum assist torque TaM by the repetitive transactions of Steps S6 to S8, the transaction advances to Step S9. At Step S9, whether the gear shift condition is satisfied is determined. In a case where the gear shift condition is not satisfied, the transaction returns to Step S1 to repeat Steps S1 to S8 until the gear shift condition is satisfied. At Step S9, when the gear shift condition is satisfied, Steps S10 to S13 corresponding to the gear shift control means are executed.

At Step S10, the engine torque Te is reduced and the motor generator 5 is actuated, and the drive torque for driving the driving front wheels 91 is changed from the engine torque Te to the assist torque Tast. Then, at Step S11, the clutch 4 is disconnected, and the selection of the gear sets is changed, or switched at Step S12. Finally, at Step S13, the state of the clutch 4 is returned to the connected state to complete a series of the gear shift control operation.

Thereafter, the transaction returns to Step S1 to repeat the gear shift control flow under the preliminary gear shift condition and the gear shift condition for the next gear stage. In a case where the preliminary gear shift condition is dissolved, or canceled during gradually reducing the motor torque Tm, during gradually reducing the engine torque Te, or during awaiting for the fulfillment of the gear shift condition, the transaction advances from Step S1 to Step S14. At Step S14, the motor torque Tm and the engine torque Te which are in the process of the gradual reduction is restored (retrieved) to have the original value, so that the original drive assist state and the electric power generating state is restored.

According to the construction of the gear shift control device for the hybrid vehicle drive system 1 of the embodiment, as shown in FIGS. 5 and 6, the drive torque for driving the driving front wheels 91 can be smoothly changed from the engine torque Te to the assist torque Tast during the gear shift operation, and a feeling that the vehicle is not accelerated in response to an accelerator operation is not generated. Further, because the electric power generation and the drive assist by the motor generator 5 are Interrupted prior to operating the clutch 4 and the automated transmission 3, the operation of changing the drive torque from the engine torque Te to the assist torque Tast during the gear shift operation is stabilized to restrain the fluctuation of the drive torque, and thus the shift shock can be reduced.

Further, during the gear shift control operation when the motor generator 5 is actuated to generate the electric power by the electric power generation torque Tgen shown in FIG. 5, the drive torque transmitted to the driving front wheels 91 throughout the gear shifting operation (i.e., from t1 to t8) agrees with, or corresponds to the driver request torque Tdrv. Accordingly, a feeling that the vehicle is not accelerated in response to an accelerator operation is not generated and it is unlikely that shift shock is generated. Further, during the gear shift control operation when the vehicle travels with the drive assist by the motor generator 5 as shown in FIG. 6, the drive torque transmitted to the driving front wheels 91 consecutively changes during (throughout) the gear shifting operation (i.e., from t11 to t18). Thus, the drive torque is reduced to be less than the driver request torque Tdrv temporarily, however, a stepwise change in torque is not generated and it is unlikely that the shift shock is generated.

Further, as shown in FIG. 7, when the engine torque Te exceeds the maximum assist torque TaM which the motor generator 5 is capable of generating, the level of the engine torque is gradually reduced to be equal to the level of the maximum assist torque TaM. Accordingly, the stepwise change in torque when changing the drive torque from the engine torque Te to the assist torque Tast is eliminated, thus reducing the generation of the shift shock.

According to the embodiment described above, both the power generation interruption means and the assist interruption means are adopted. Alternatively, one of the power generation interruption means and the assist interruption means may be adopted. Further, the engine torque gradually reducing means may be adopted or may not be adopted. Further, the drive system 1 is configured to start the vehicle and to drive the vehicle for traveling only by the assist torque Tast of the motor generator 5 without the engine torque Te. The drive system 1 is configured to regenerate to produce the electricity by the motor generator 5 using the input from the driving front wheels 91 when applying the braking. The construction of the drive system 1 is not limited to the structure shown in FIG. 1. Various methods for gear shift control are applicable and variations of the construction are applicable.

According to the construction of the disclosure, gear shift control device for a hybrid vehicle drive system for controlling the hybrid vehicle drive system which includes an automated transmission (3) including an input shaft (31) configured to be rotated by an engine torque (Te) which is outputted from an output shaft (21) of an engine (2) mounted to a vehicle and which is controlled by an output control mechanism (23, 28), and an output shaft (32) rotatably connected to a driving wheel (91), the automated transmission (3) selectively meshing one of plural gear sets of a gear train allowing to rotatably connect the Input shaft (31) and the output shaft (32) with different gear ratios each other by a gear switching mechanism (34, 35), a clutch (4) configured to switch a connected state where the output shaft (21) of an engine (2) and the input shaft (31) of the automated transmission (3) are rotatably connected for adjusting a clutch torque (Tc) and a disconnected state where the output shaft (21) of an engine (2) and the input shaft (31) of the automated transmission (3) are disconnected by a clutch actuation mechanism (48), and a motor generator (5) rotatably connected to the output shaft (32) of the automated transmission (3) and the driving wheel (91), the motor generator (5) selectively generating an assist torque (Tast) which is addable to the engine torque (Te) for performing a drive assist of the driving wheel (91) and generating an electric power by being actuated by a torque (Tgen) for electric power generation among the engine torque (Te), the gear shift control device controlling the hybrid vehicle drive system to change a selection of the gear sets of the gear train for the automated transmission (3), includes a torque indication portion for indicating a drive torque which is determined in accordance with an operation amount of an accelerator operated by a driver and is requested to be outputted to the driving wheel (91) as a driver request torque converted into the engine torque (Te), a power generation interruption portion for gradually reducing the torque (Tgen) for electric power generation to be zero by means of the output control mechanism (throttle valve 23, injector 28) and changing a vehicle state to an engine driven state using all of the engine torque (Te) when a preliminary gear shift condition of the automated transmission (3) is satisfied in a state where the engine drives the driving wheel (91) via the clutch (4), which is in the connected state, by the driver request torque (Tdrv) among the engine torque (Te) and in a state where the motor generator (5) is actuated to generate an electric power by the torque (Tgen) for electric power generation, a gear shift control portion reducing the engine torque (Te) by the output control mechanism (throttle valve 23, injector 28) and generating an assist torque (Tast) corresponding, to a decrement of the engine torque (Te) by actuating the motor generator (5), disconnecting the clutch (4) by the clutch actuation mechanism (48), and returning the clutch (4) to the connected state by the clutch actuation mechanism (48) after changing the selection of the gear sets of the gear train by the gear switching mechanism (34, 35) when a gear shift condition of the automated transmission (3) is satisfied during the engine driven state of the vehicle after an interruption of power generation by the power generation portion where the torque (Tgen) for electric power generation is zero.

According to the construction of the embodiment, the gear shift control device for the hybrid vehicle drive system gradually reduces a torque (Tgen) for electric power generation to zero for changing a state of the vehicle to an engine driven state using all of the engine torque (Te) when the preliminary gear shift condition is satisfied in a state where the driving wheel is driven by the driver request torque among the engine torque (Te) outputted from the engine (2) and the motor generator (5) is actuated by the torque (Tgen) for electric power generation to generate electric power. When the gear shift condition is satisfied thereafter, the engine torque (Te) is reduced, and the assist torque (Tast) is generated to perform a gear shift operation by the clutch (4) and the automated transmission (3).

Thus, a drive torque for driving the driving wheels during the gear shift operation can be smoothly switched, or changed from the engine torque (Te) to the assist torque (Tast), and a feeling that the vehicle is not accelerated in response to an accelerator operation is not generated. Further, because the electric power generation of the motor generator is interrupted before starting the operation of the clutch (4) and the automated transmission (3), an operation of the change in torques, or a switching operation of the torque from the engine torque to the assist torque during the gear shift operation is stabilized to restrain a fluctuation of the drive torque, and thus reducing a shift shock. Provided that the gear shift operation is started without interrupting the electric power generation, an assist torque (Tast) cannot be generated until the clutch is disconnected, and is becomes difficult to smoothly change the drive torque from the engine torque (Te) to the assist torque (Tast).

According to the construction of the disclosure, gear shift control device for a hybrid vehicle drive system for controlling the hybrid vehicle drive system which includes an automated transmission (3) including ah input shaft (31) configured to be rotated by an engine torque (Te) which is outputted from an output shaft (21) of an engine (2) mounted to a vehicle and which is controlled by an output control mechanism (throttle valve 23, injector 28), and an output shaft (32) rotatably connected to a driving wheel (91), the automated transmission (3) selectively meshing one of plural gear sets of a gear train allowing to rotatably connect the input shaft (31) and the output shaft (32) with different gear ratios each other by a gear switching mechanism (34, 35), a clutch (4) including a clutch actuation mechanism (48) switching a connected state where the output shaft (21) of en engine (2) and the input shaft (31) of the automated transmission (3) are rotatably connected for adjusting a clutch torque (Tc) and a disconnected state where the output shaft (21) of an engine (2) and the input shaft (31) of the automated transmission (3) are disconnected, and a motor generator (5) rotatably connected to the output shaft (32) of the automated transmission (3) and the driving wheel (91), the motor generator (5) selectively generating an assist torque (Tast) which is addable to the engine torque (Te) for performing a drive assist of the driving wheel (91) and generating an electric power by being actuated by a torque (Tgen) for electric power generation among the engine torque (Te), the gear shift control device controlling the hybrid vehicle drive system to change the gear sets of the gear train for the automated transmission (3), includes a torque indication portion for indicating a drive torque which is determined in accordance with an operation amount of an accelerator operated by a driver and is requested to be outputted to the driving wheel (91) as a driver request torque (Tdrv) converted Into the engine torque (Te), an assist interruption portion gradually reducing an assist torque (Tast) to be zero by the output control mechanism (throttle valve 23, injector 28) for changing a vehicle state to an engine driven state only by the engine torque (Te) when a preliminary gear shift condition of the automated transmission (3) is satisfied in a state where the engine (2) drives the drive wheel (91) via the clutch (4), which is in the connected state, by the engine torque (Te) and in a state where the motor generator (5) generates the assist toque corresponding to a torque subtracting the engine torque (Te) from the driver request torque (Tdrv), a gear shift control portion reducing the engine torque (Te) by the output control mechanism (throttle valve 23, injector 28) and generating an assist torque (Tast) corresponding to a decrement of the engine torque (Te) by actuating the motor generator (5), disconnecting the clutch (4) by the clutch actuation mechanism (48), and returning the clutch (4) to the connected state by the clutch actuation mechanism (48) after changing the selection of the gear sets of the gear train by the gear switching mechanism (34, 35) when a gear shift condition of the automated transmission (3) is satisfied during the engine driven state of the vehicle after an interruption of an assist by the assist torque where the assist torque (Tast) is zero.

According to the disclosure, the assist torque (Tast) is gradually reduced to be zero to change the vehicle state to the engine driven state only by the engine torque (Te) when the preliminary gear shift condition is satisfied in a state where the driving wheel (91) is driven by the engine torque (Te) outputted from the engine and the assist torque (Tast) is generated by the motor generator (5) to assist the driving of the driving wheel (91). In a case where the gear shift condition is satisfied thereafter, the engine torque (Te) is reduced and the assist torque (Tast) is generated to operate the gear shift operation by the clutch (4) and the automated transmission (3).

Accordingly, the drive torque for driving the driving wheel can be smoothly changed, or switched from the engine torque (Te) to the assist torque (Tast) during the gear shift operation, and a feeling that the vehicle is not accelerated in response to an accelerator operation is not generated. Further, because the drive assist by the motor generator (5) is interrupted before start operating the clutch (4) and the automated transmission (3), an operation of the change in torques, or a switching operation of the torque from the engine torque to the assist torque during the gear shift operation is stabilized to restrain the fluctuation of the drive torque, thus reducing a shift shock. Provided that the gear shift operation is started without interrupting the drive assist, because a generation amount of the assist torque (Tast) immediately before staring the gear shift operation is different every time, a control for the assist torque (Tast) during the gear shift operation is assumed to be difficult, and it becomes difficult to smoothly change the drive torque from the engine torque (Te) to the assist torque (Tast).

According to the construction of the disclosure, the gear shift control portion generates the assist torque (Tast) corresponding to an amount subtracting the engine torque (Te) from the driver request torque (Tdrv) by actuating the motor generator (5) when the gear shift condition of the automated transmission (3) is satisfied during the engine driven state of the vehicle.

According to the construction of the disclosure, when the gear shift condition is satisfied, the assist toque corresponding to the amount subtracting the engine torque (Te) from the driver request torque is generated by actuating the motor generator (5). Accordingly, the drive torque transmitted to the driving wheel agrees with, or corresponds to the driver request torque, thus the a feeling that the vehicle is not accelerated in response to an accelerator operation is not generated, and the shift shock is unlikely generated.

According to the construction of the disclosure, the gear shift control device further includes an engine torque gradually reducing portion for gradually reducing the engine torque (Te) to be equal to a maximum assist torque (TaM) in a case where the engine torque (Te) exceeds the maximum assist torque (TaM) which the motor generator (5) allows to generate before starting an operation of the gear shift control portion.

According to the construction of the disclosure, the engine torque (Te) is gradually reduced to be equal to the maximum assist torque (TaM) In a case where the engine torque (Te) exceeds the maximum assist torque (TaM) that the motor generator (5) is able to generate before starting the operation of the gear shift control portion. By gradually reducing the engine torque (Te) before starting the gear shift operation, a stepwise change In torque of the drive torque during the gear shift operation is not generated, and the shift shock can be reduced. Provided that the gradual reduction of the engine torque (Te) is not operated, a stepwise change in torque is generated to generate the shift shock when changing, or switching the drive torque from the engine torque (Te) to the maximum assist torque (TaM) during the gear shift operation.

According to the construction of the disclosure, the clutch (4) is disconnected in a case where the engine torque (Te) is assumed to be zero by the reduction of the engine torque (Te) after the gear shift condition of the automated transmission is satisfied.

According to the construction of the disclosure, the clutch is disconnected in a case where the gear shift condition of the automated transmission (3) is satisfied and the engine torque (Te) is assumed to be zero by the reduction of the engine torque after the engine torque is assumed to be equal to the maximum assist torque by gradually reducing the engine torque to be equal to the maximum assist torque.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A gear shift control device for a hybrid vehicle drive system for controlling the hybrid vehicle drive system which comprises an automated transmission including an input shaft configured to be rotated by an engine torque which is outputted from an output shaft of an engine mounted to a vehicle and which is controlled by an output control mechanism, and an output shaft rotatably connected to a driving wheel, the automated transmission selectively meshing one of plural gear sets of a gear train allowing to rotatably connect the input shaft and the output shaft with different gear ratios each other by a gear switching mechanism; a clutch configured to switch a connected state where the output shaft of an engine and the input shaft of the automated transmission are rotatably connected for adjusting a clutch torque and a disconnected state where the output shaft of an engine and the input shaft of the automated transmission are disconnected by a clutch actuation mechanism; and a motor generator rotatably connected to the output shaft of the automated transmission and the driving wheel, the motor generator selectively generating an assist torque which is addable to the engine torque for performing a drive assist of the driving wheel and generating an electric power by being actuated by a torque for electric power generation among the engine torque, the gear shift control device controlling the hybrid vehicle drive system to change a selection of the gear sets of the gear train for the automated transmission, comprising:
  a torque indication portion for Indicating a drive torque which is determined in accordance with an operation amount of an accelerator operated by a driver and is requested to be outputted to the driving wheel as a driver request torque converted into the engine torque;
  a power generation interruption portion for gradually reducing the torque for electric power generation to be zero by portion of the output control mechanism and changing a vehicle state to an engine driven state using all of the engine torque when a preliminary gear shift condition of the automated transmission is satisfied in a state where the engine drives the driving wheel via the clutch, which is in the connected state, by the driver request torque among the engine torque and in a state where the motor generator is actuated to generate an electric power by the torque for electric power generation; and
  a gear shift control portion reducing the engine torque by the output control mechanism and generating an assist torque corresponding to a decrement of the engine torque by actuating the motor generator, disconnecting the clutch by the clutch actuation mechanism, and returning the clutch to the connected state by the clutch actuation mechanism after changing the selection of the gear sets of the gear train by the gear switching mechanism when a gear shift condition of the automated transmission is satisfied during the engine driven state of the vehicle after an interruption of power generation by the power generation portion where the torque for electric power generation is zero.

2. The gear shift control device for the hybrid vehicle drive system according to claim 1, wherein the gear shift control portion generates the assist torque corresponding to an amount subtracting the engine torque from the driver request torque by actuating the motor generator when the gear shift condition of the automated transmission is satisfied during the engine driven state of the vehicle.

3. The gear shift control device for the hybrid vehicle drive system according to claim 1, further comprising:
  an engine torque gradually reducing portion for gradually reducing the engine torque to be equal to a maximum assist torque in a case where the engine torque exceeds the maximum assist torque which the motor generator allows to generate before starting an operation of the gear shift control portion.

4. The gear shift control device for the hybrid vehicle drive system according to claim 3, wherein the clutch is disconnected in a case where the gear shift condition of the automated transmission is satisfied and the engine torque is assumed to be zero by the reduction of the engine torque after the engine torque is assumed to be equal to the maximum assist torque by gradually reducing the engine torque to be equal to the maximum assist torque.

5. The gear shift control device for the hybrid vehicle drive system according to claim 1, wherein the clutch (4) is disconnected in a case where the engine torque is assumed to be zero by the reduction of the engine torque after the gear shift condition of the automated transmission is satisfied.

6. A gear shift control device for a hybrid vehicle drive system for controlling the hybrid vehicle drive system which comprises an automated transmission including an input shaft configured to be rotated by an engine torque which is outputted from an output shaft of an engine mounted to a vehicle and which is controlled by an output control mechanism, and an output shaft rotatably connected to a driving wheel, the automated transmission selectively meshing one of plural gear sets of a gear train allowing to rotatably connect the input shaft and the output shaft with different gear ratios each other by a gear switching mechanism; a clutch including a clutch actuation mechanism switching a connected state where the output shaft of an engine and the input shaft of the automated transmission are rotatably connected for adjusting a clutch torque and a disconnected state where the output shaft of an engine and the input shaft of the automated transmission are disconnected; and a motor generator rotatably connected to the output shaft of the automated transmission and the driving wheel, the motor generator selectively generating an assist torque which is addable to the engine torque for performing a drive assist of the driving wheel and generating an electric power by being actuated by a torque for electric power generation among the engine torque, the gear shift control device controlling the hybrid vehicle drive system to change the gear sets of the gear train far the automated transmission, comprising:
  a torque indication portion for indicating a drive torque which is determined in accordance with an operation amount of an accelerator operated by a driver and is requested to be outputted to the driving wheel as a driver request torque converted into the engine torque;
  an assist interruption portion gradually reducing an assist torque to be zero by the output control mechanism for changing a vehicle state to an engine driven state only by the engine torque when a preliminary gear shift condition of the automated transmission is satisfied in a state where the engine drives the drive wheel via the clutch, which is in the connected state, by the engine torque and in a state where the motor generator generates the assist toque corresponding to a torque subtracting the engine torque from the driver request torque; and
  a gear shift control portion reducing the engine torque by the output control mechanism and generating an assist torque corresponding to a decrement of the engine torque by actuating the motor generator, disconnecting the clutch by the clutch actuation mechanism, and returning the clutch to the connected state by the clutch actuation mechanism after changing the selection of the gear sets of the gear train by the gear switching mechanism when a gear shift condition of the automated transmission is satisfied during the engine driven state of the vehicle after an interruption of an assist by the assist torque where the assist torque is zero.

7. The gear shift control device for the hybrid vehicle drive system according to claim 6, wherein the clutch (4) is disconnected in a case where the engine torque is assumed to be zero by the reduction of the engine torque after the gear shift condition of the automated transmission is satisfied.

* * * * *